United States Patent [19]

Kakuta et al.

[11] Patent Number: 5,402,428
[45] Date of Patent: Mar. 28, 1995

[54] ARRAY DISK SUBSYSTEM

[75] Inventors: Hitoshi Kakuta, Kokubunji; Yoshihisa Kamo, Musashimurayama; Hajime Aoi, Tachikawa, all of Japan

[73] Assignee: Hitachi, Ltd., Tokyo, Japan

[21] Appl. No.: 630,210

[22] Filed: Dec. 19, 1990

[30] Foreign Application Priority Data

Dec. 25, 1989 [JP] Japan .................. 1-332718

[51] Int. Cl.⁶ .............. G06F 11/00; G06F 1/00; G06F 13/00
[52] U.S. Cl. ................... 371/10.1; 371/8.1; 364/268.3; 364/268.5
[58] Field of Search ............ 371/10.1, 8.1, 9.1, 371/40.1; 395/575; 364/236.2, 236.4, 238.4, 952.1, 952.6, 268.9, 268.3, 268.5, 285.1, 285.3

[56] References Cited

U.S. PATENT DOCUMENTS

| | | | |
|---|---|---|---|
| 4,817,035 | 3/1989 | Timsit | 371/10.1 |
| 4,899,342 | 2/1990 | Potter et al. | 371/10.1 |
| 4,914,656 | 4/1990 | Dumphy, Jr. et al. | 371/40.1 |
| 4,942,579 | 7/1990 | Goodlander et al. | 371/10.1 |
| 5,109,505 | 4/1992 | Kihara et al. | 371/10.1 |

OTHER PUBLICATIONS

"Providing Fault Tolerance in Parallel Secondary Storage Systems", Park et al, Princeton University, Nov. 7, 1986.

"A Case for Redundant Arrays of Inexpensive Disks (RAID)", Patterson et al, University of California.

"Coding Techniques for Handling Failures in Large Disk Arrays", Gibson et al, University of California, Dec., 1988.

*Primary Examiner*—Robert W. Beausoliel, Jr.
*Assistant Examiner*—Trinh Tu
*Attorney, Agent, or Firm*—Fay, Sharpe, Beall, Fagan, Minnich & McKee

[57] ABSTRACT

An array disk subsystem including a command selector for separating a signal from a host into a data item and a command, a data dividing unit for subdividing the data item, an ECC generator for producing an ECC for each of the obtained subdata items, a group of data disks for respectively storing thereon the subdata items and the ECCs, a command interpreting unit for interpreting the command, an I/O counter for counting I/O commands in the command, a backup processor for requesting a backup command based on count information of the I/O counter, and a backup unit responsive to the backup command for sequentially reading the subdata items and the ECCs from the data disks to record therein the subdata items and the ECCs.

23 Claims, 12 Drawing Sheets

ARRAY DISK SUBSYSTEM

BACKGROUND OF THE INVENTION

The present invention relates to a secondary storage subsystem including a secondary storage controller and a secondary storage in which the secondary storage subsystem is connected to a host such as a central processing unit (CPU) to store therein data necessary for the host and to restore the data when required. More specifically, the present invention relates to an array disk subsystem having a plurality of secondary Storage controllers and a plurality of secondary storages wherein the subsystem is capable of achieving ordinary input/output processing even while a backup processing is being executed. The backup processing here is accomplished to store information of the secondary storage in another store means for a backup use, which is effective for an acquisition of data when an access to the data stored in the subsystem is prevented due to a failure such as an erroneous operation conducted by an operator, a software error, or a hardware error.

In computer systems at the present stage of art, data necessary for the host is loaded in a secondary storage such that the data is obtained from the secondary storage when a data request is requested from the host. As the secondary storage, a nonvolatile storage is employed in general; typically, a direct access storage device such as a magnetic disk or an optical disk is adopted. Although these secondary storage devices have a considerably high reliability, there may still exist a chance of a failure which prevents data stored therein from being accessed.

In order to cope with the difficulty above, there has already been known a backup processing method in which, as shown in FIG. 6, during a period of time when a computer system is not utilized from an external device, data stored in a magnetic disk 11 of a secondary storage is transferred via a disk controller (DKC) 14 to a CPU 1, which then records the data on a magnetic tape (MT) 12 via a magnetic tape controller (MTC) 15 or on an optical disk (OD) 13 via an optical disk controller (ODC) 16.

Furthermore, in accordance with the present invention, there is accomplished a parallel processing in which a plurality of disk drives each being associated with a relatively small capacity are prepared so that data transferred from the CPU 1 is split into subdata items to be stored in the respective disk drives. A parallel processing system of this type has already been put to the market, for example, from Storage Concepts Corp. A method of improving the reliability in such a system has been described in "Providing Fault Tolerance In Parallel Secondary Storage Systems" written by Arvin Park and K. Balasubramanian of the Department of Computer Science, Princeton University (Nov. 7, 1986). The configuration of the system has also been discussed in the report above.

SUMMARY OF THE INVENTION

In the secondary storage of the computer system of the prior art, the data handling on the secondary storage is interrupted while the backup processing is taking place. Due to the development of computer applications in various fields and the growing volume of information, the amount of data to be stored in the secondary storage can be considered to continue to be increasing. Resultantly, according to the backup processing method of the existing secondary storage, the backup processing takes quite a long period of time, which leads a considerable problem with respect to the utilization efficiency of the computer system. Moreover, in a case of a 24-hour online system continuously running for daily jobs in a bank or a stock brokerage firm, when the backup processing prevents the secondary storage from being used for such a long period of time, the throughput of the system will be remarkably lowered. In this situation, there has been needed a backup processing in which the CPU can conduct an ordinary input/output processing without taking the backup processing into consideration and even while the backup processing is in process.

In accordance with the present invention, there is provided an array disk subsystem including a unit for achieving input and output operations of data items with a host, a unit for subdividing a data item from the host into subdata items, a unit for generating error correction codes (ECCs) from the subdata items, a group of disk units for respectively storing therein the subdivided data items and the ECCs, a backup unit for sequentially achieving a backup operation on the data items in the group of disk units, a unit operative in response to a read command required from the host to the group of disk units including a disk unit under a backup operation for reading a data item and an ECC from one of the disk units not under the backup operation, and a unit for restoring, based on the data item and the ECC thus read from the disk unit, data stored in the disk unit under the backup operation.

Moreover, according to an aspect of the present invention, there is provided a data processing apparatus including a CPU, a unit for subdividing a data item from the CPU into subdata items, a unit for generating ECCs from the subdata items, a group of disk units for respectively storing therein the subdivided data items and the ECCs, a backup unit for sequentially achieving a backup operation on the data items in the group of disk units, a unit operative in response to a read command required from the CPU to the group of disk units including a disk unit under a backup operation for reading a data item and an ECC from one of the disk units not under the backup operation, and a unit for restoring, from the data item and the ECC thus read from the disk unit, data stored in the disk unit under the backup operation.

In addition, in accordance with another aspect of the present invention, there is provided an array disk subsystem including a unit for achieving input and output operations of data items with a host, a unit for subdividing a data item from the host into subdata items, a unit for generating ECCs from the subdata items, a group of disk units for respectively storing therein the subdivided data items and the ECCs, a backup unit for sequentially achieving a backup operation on the data items in the group of disk units, a store unit operative in response to a write command issued from the host to the group of disk units including a disk unit under a backup operation for storing therein a data item to be written in the group of disk units, and a unit for transferring, after the backup operation is completed, the data from the store unit for recording the data item in the group of disk units.

Moreover, in accordance with still another aspect of the present invention, there is provided an array disk subsystem comprising a unit for achieving input and output operations of data items with a host, a unit for subdividing a data item from the host into subdata items, a unit for generating ECCs from the subdata items, a group of disk units for respectively storing therein the subdivided data items and ECCs, a backup unit for sequentially achieving a backup operation on the data items associated with the group of disk units, a unit for monitoring input/output commands from the host, and a unit operative when a frequency of the input/output commands is less than a fixed value for transferring data from the group of disk units to the backup unit to accomplish a backup operation of the data.

A data item sent from the CPU is subdivided into subdata items to produce ECCs for the subdata items and then the ECCs and the associated subdata items are respectively stored in disk drive units. An ECC which is a code generated from a subdata item has information related to the subdata item. When an error occurs in a subdata item, the ECCs and the remaining subdata items thus stored can be used to correct the subdata item. More specifically, a data item transferred from the CPU is split by the data control unit or a data controller into subdata items. An ECC is created for each subdata item such that the ECC and the subdata item are stored in different disk drive units. With this provision, a subdata item missing in the subdivided data items for some reasons may be restored by use of the remaining subdata items and the ECCs. These ECCs have been known and can be produced in various methods. In the backup operation, the system sequentially conducts a backup operation on the disk drive units associated with the subdata items. When a write request is received during a backup operation, the write data is temporarily saved in another location, so that the data is written in the disk drive units after the backup operation is finished. In a case of a read request received during a backup operation, the disk drive units excepting one under the backup operation are accessed to read therefrom the pertinent subdata items and the ECCs so as to restore the subdata item stored in the disk drive unit under the backup operation. The subdata items are rearranged again to be transferred to the CPU.

As above, a data item is split into subdata items and then an ECC is generated for each subdata item so as to store the subdata items and the associated ECCs in different disk drive units, thereby sequentially achieving a backup operation on the respective disk drive units. With the provision above, even during a backup operation, a data item can be restored or reconstructed by using the ECCs and subdata items so as to accept a read request from the CPU. In addition, a write request can be accepted also during a backup operation as follows. Namely, a data item of the write command is temporarily saved in a location such that the write data is written in the disk drive units after the backup operation is completed. Resultantly, the input/output requests from the CPU can be processed even during the backup operation.

BRIEF DESCRIPTION OF THE DRAWINGS

These and other objects and advantages of the present invention will become apparent by reference to the following description and accompanying drawings wherein.

DESCRIPTION OF THE PREFERRED EMBODIMENTS

Embodiment 1

Figure 1:
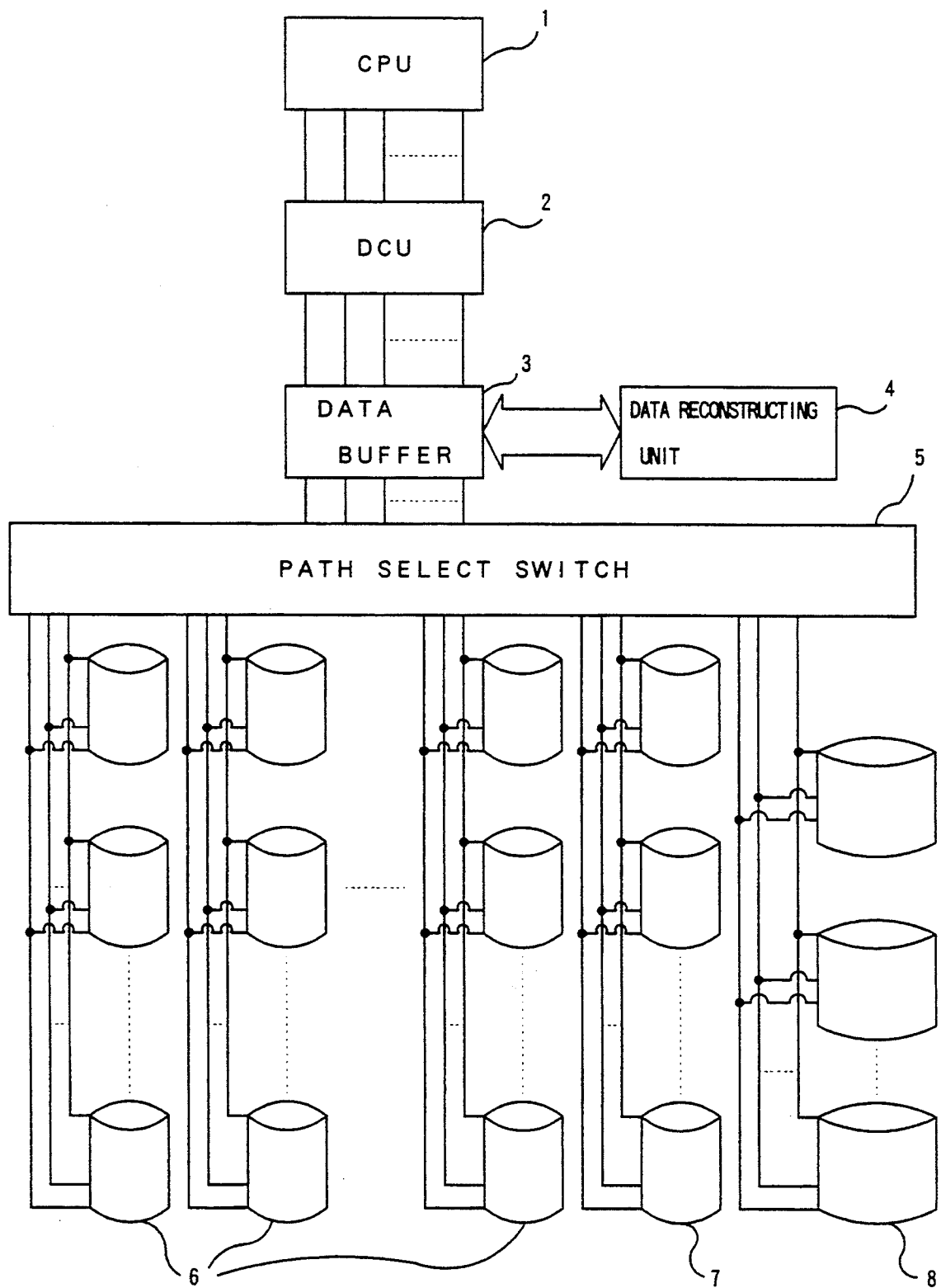
FIG. 1 is a schematic diagram showing an overall constitution of an array disk subsystem according to the present invention.

Referring now to FIG. 1, a description will be given of an embodiment according to the present invention. This embodiment comprises a CPU 1, a data control unit (DCU) 2, a data buffer 3, a data reconstructing unit 4, a path selection switch 5, data storing magnetic disks (data disks) 6, ECC storing magnetic disks (ECC disks) 7, and backup disks 8. An input/output (I/O) request requested from the CPU 1 is delivered via the DCU 2 to the respective magnetic disks.

Figure 2:
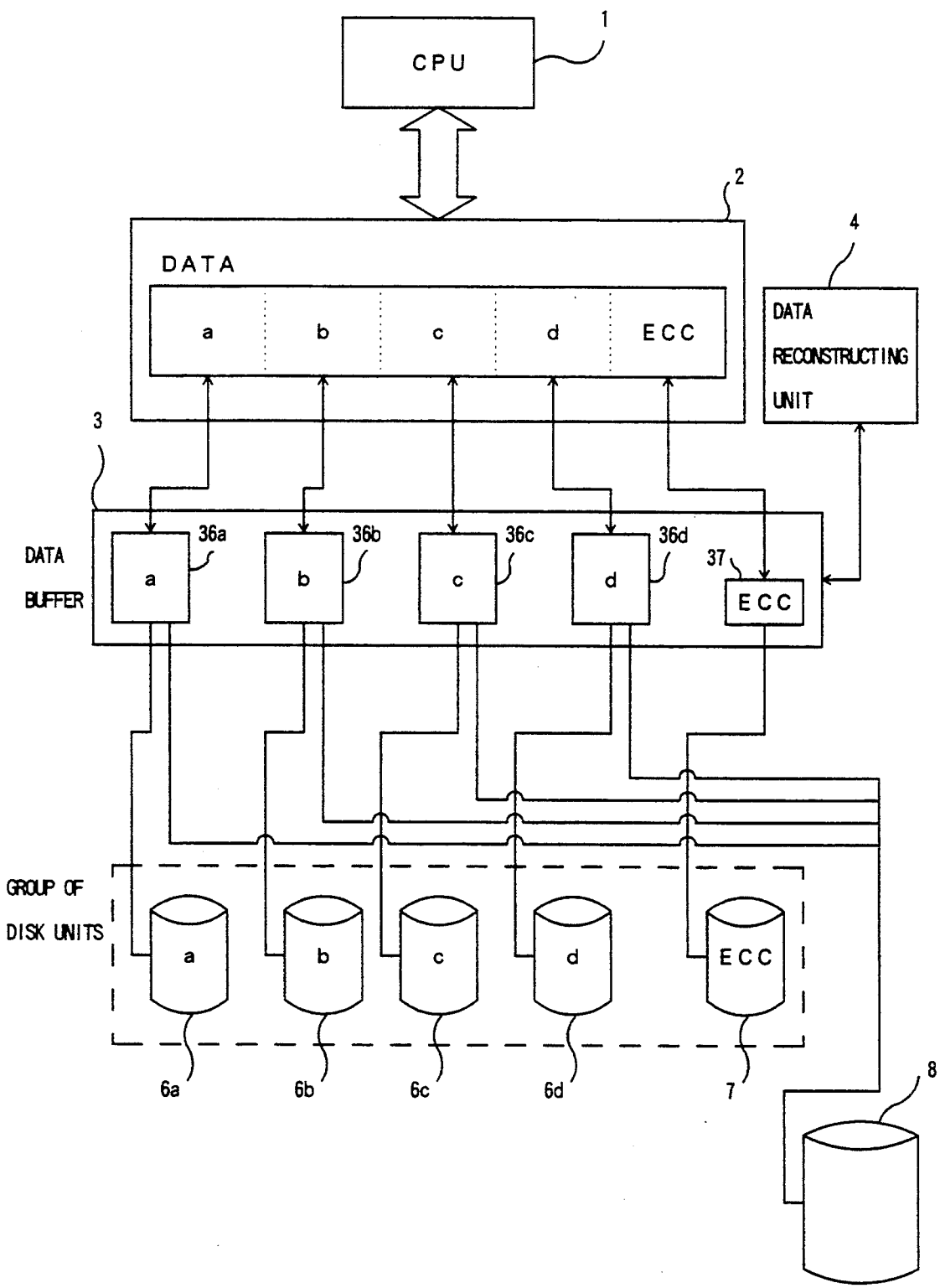
FIG. 2 is a diagram showing the configuration of a first embodiment of the array disk subsystem according to the present invention.

Referring next to FIG. 2 showing the system of FIG. 1 in more schematic manner, a description will be given of the I/O processing executed in this system.

First, a write operation of the system will be described. When an I/O request issued from the CPU 1 is received by a group including data disks 6a to 6d and an ECC disk 7, data transferred from the CPU 1 is subdivided by the DCU 2 into four subdata items a, b, c, and d. For each subdata item, the DCU 2 generates an ECC. The ECC produced from the subdata item has information related to the subdata item. When an error occurs in a subdata item, the subdata item can be corrected by using the remaining correct subdata items and the ECCs. The subdivision of the data, a device for the data subdivision, and a configuration of the device have been described, for example, in "A Case for Redundant Arrays of Inexpensive Disk (RAID)" written by David A. Patterson et al. of Computer Science Division of University of California. For example, in a case where a failure makes it impossible to read the data item c from a data disk, the data item c can be restored from the remaining data items a, b, and d and the ECCs. The ECC may be, as well known, created according to a system of parity, hamming, or Reed-Solomon codes. In this embodiment, a data item is subdivided into four subdata items; however, in consideration of the system configuration or the like, the number of subdivided data items may be altered without causing any trouble. Subsequently, the obtained subdata items a to d and the associated ECCs are simultaneously stored in the respective disk drive units. First, these items a to d and the ECCs are temporarily stored in data buffers 36a, 36b, 36c, 36d, and 37, respectively. In each disk drive unit, like in a conventional disk drive unit, a seek operation is conducted to move a read/write head to position over a track in which data is to be stored. Thereafter, a wait period of time or a rotational latency is elapsed to wait for a portion of the track for the data write operation. The subdivided data items a to d and the ECCs are transferred from the associated data buffers 36a to 36d and the data buffer 37 to be loaded in the predetermined data disks 6a, 6b, 6c, 6d, and the ECC disk 7, respectively. Although the data items a to d and the ECCs are respectively recorded on disks installed in different disk drive units in this embodiment, there may be employed, for example, a single disk drive unit provided with a plurality of disk surfaces so that the obtained subdata items a to d and the ECCs are respectively written on the different disk surfaces.

Next, a description will be given of a read operation achieved in the system. When a read request from the CPU 1 is received by the data disks 6a to 6d of the group, the seek operation and the wait operation for the rotational latency are carried out for each data disk. When the read operation is possible, a subdata item is read therefrom. The respective subdata items a to d are transferred to the buffer 3 to be reconstructed under control of the DCU 2, thereby sending the resultant data to the CPU 1. Subsequently, the read processing will be described in conjunction with a case where a read operation is impossible due to a failure. For example, when a read failure takes place on the data disk 6c of the group, the subdata items a, b, and d and the ECCs are read from the data disks 6a, 6b, and 6d and the ECC disk 7 to be transferred to the buffer 3. Based on these items, the data reconstructing unit 4 restores the subdata item c of the data disk 6c and then the original data is reconstructed under control of the DCU 2 to be sent to the CPU 1. In this system, the read and write operations are thus accomplished in response to input/output requests requested from the CPU 1.

Figure 10:
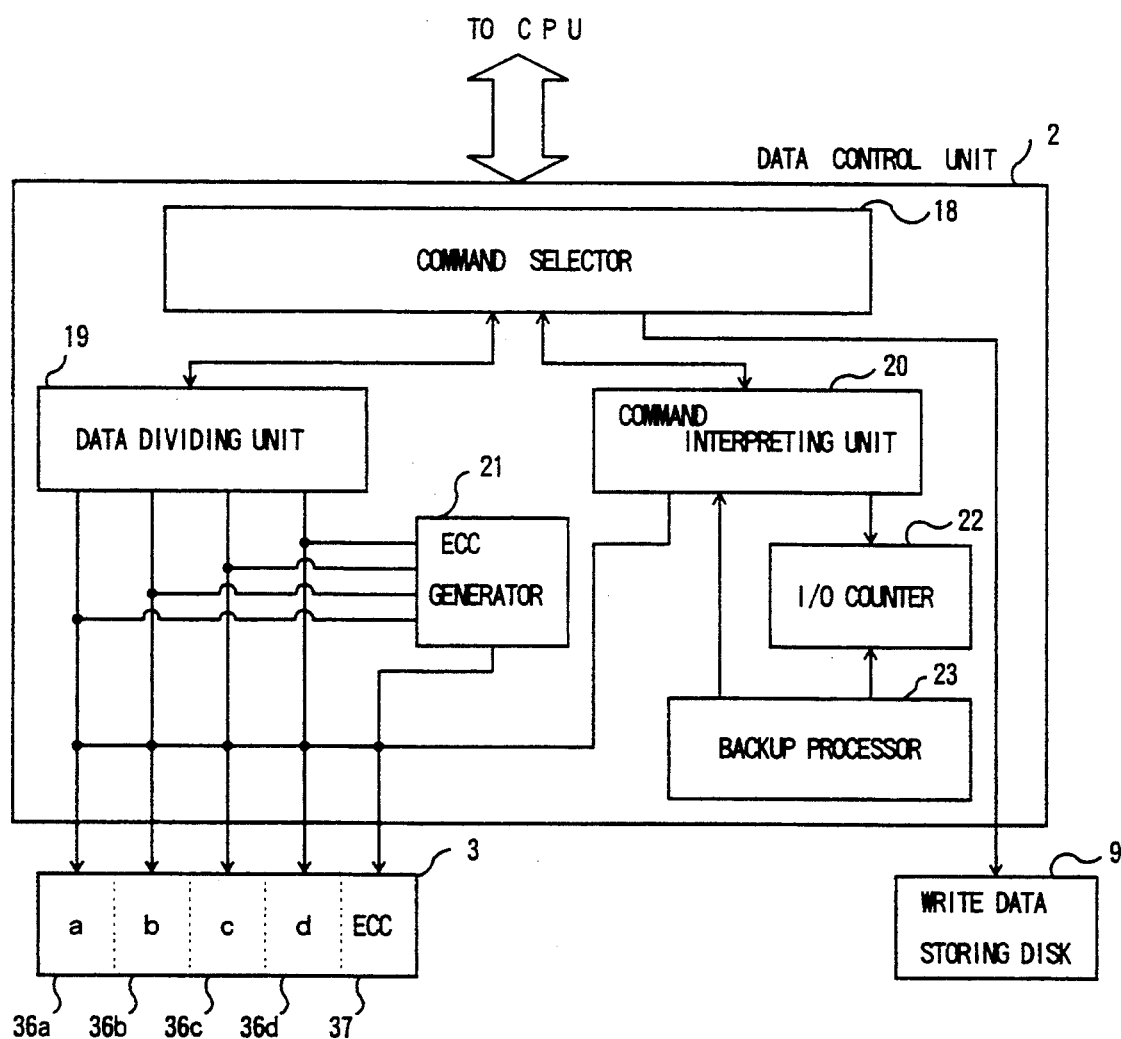
FIG. 10 is a block diagram showing the configuration of a data control unit (DCU) according to the present invention.

Next, the data backup method of the system will be described. Since the backup operation is achieved under control of the DCU 2 in this system, the CPU 1 need not take part in the backup operation. Referring now to FIG. 10, the internal constitution of the DCU 2 will be described in detail. An I/O request issued from the CPU 1 is separated by a command selector 18 into a data item and a command. The data item is split by a data dividing unit 19 into subdata items, which are loaded in the data buffers 36a to 36d, respectively. In addition, an ECC generator 21 creates ECCs of these subdata items and then stores the obtained ECCs in the ECC data buffer 37. On the other hand, the command is decoded by a command interpreting unit 20 to be issued via the data buffers 36a to 36d to the data disks 6a to 6d and the ECC disk 7. At the same time with the command decoding operation in the command interpreting unit 20, the number of I/O operations is counted by an I/O counter 22. The I/O count thus attained by the I/O counter 22 is continuously monitored by a backup processor 23. When the I/O request count is less than a predetermined value, the backup processor 23 sends a backup command via the command interpreting unit 20 to the data disks 6a to 6d. Functions of the backup processor 23 will be summarized as follows.

1) Monitors the number of I/O requests in the I/O counter.
2) Stores the previous backup time.
3) Issues a backup initiate command based on the operations 1) and 2) above.
4) Sets a backup-in-process flag to ON/OFF.
5) Rejects a write request.
6) Issues a read command.

As above, the DCU 2 continuously monitors the state of I/O requests issued from the CPU 1. When the frequency of the I/O requests is relatively low, the DCU 2 issues a backup command to the pertinent group of disks. Specifically, the backup processor 23 may be configured as a dedicated unit including gate arrays or may be implemented by using a general-purpose multiprocessor unit.

Figure 12:
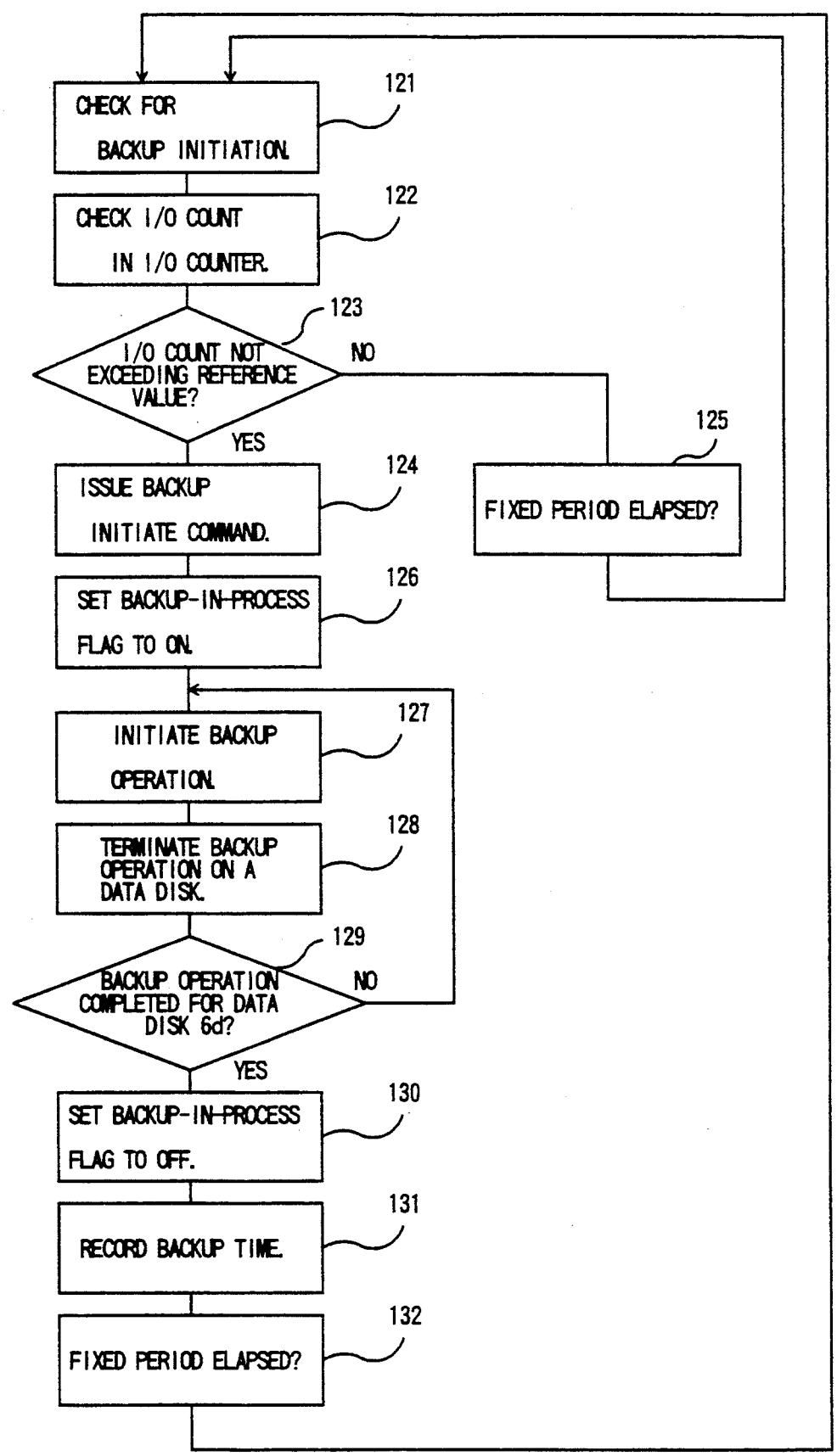
FIG. 12 is a flowchart showing a flow of a backup processing in accordance with the present invention.

FIG. 12 shows an example of a flow of the backup processing. When the backup processor 23 recognizes that a predetermined period of time is already elapsed from the previous backup time stored therein or when a backup instruction is received from the CPU 1, a check is made to determine an initiation of the backup operation (step 121). For a backup instruction from the CPU 1, the backup operation is immediately started. In other cases, the backup processor 23 references the state of the current I/O count in the I/O counter 22 (step 122). If the count is not exceeding the reference value (step 123), a backup initiate command is issued (step 124) to execute the backup processing. Otherwise, the backup processor initiates the check for the backup initiation when the predetermined period of time is elapsed thereafter (step 125). After the backup initiate command is issued (step 124) for a backup group of disks, the backup processor 23 sets a backup-in-process flag to ON for the backup group (step 126), thereby indicating that the group is under the backup operation. Thereafter, the backup processor 23 actually issues a backup command to the command interpreting unit 20, which in turn initiates the backup operation for the objective data disks and the backup disk 8 (step 127).

From the data disks specified by the backup processor 23, data for the backup use is transferred to the backup disk 8 under control of the backup processor 23, thereby accomplishing the backup of the data. In this situation, when viewed from the objective data disks, the backup processor 23 virtually seems to be the CPU 1. The backup operation is sequentially achieved for the respective data disks as above. Incidentally, each time the backup operation is finished on a data disk (step 128), the backup processor 23 judges to decide whether or not the pertinent data disk is the last data disk to undergo the backup operation (step 129). If this disk is not the data disk 6d, namely, the last disk (step 127); control returns to the step 127 to initiate the backup operation of the subsequent data disk. When the backup operation thus sequentially achieved up to the data disk 6d, the backup processor 23 sets the backup-in-process flag to OFF (step 130). The backup processor 23 then records the backup end time of each data disk (step 131). Subsequently, when the predetermined period of time is elapsed after the backup end time (step 132) or when a backup instruction is received from the CPU 1, the backup processor 23 again checks to determine the initiation of the backup operation (step 121).

Figure 13:
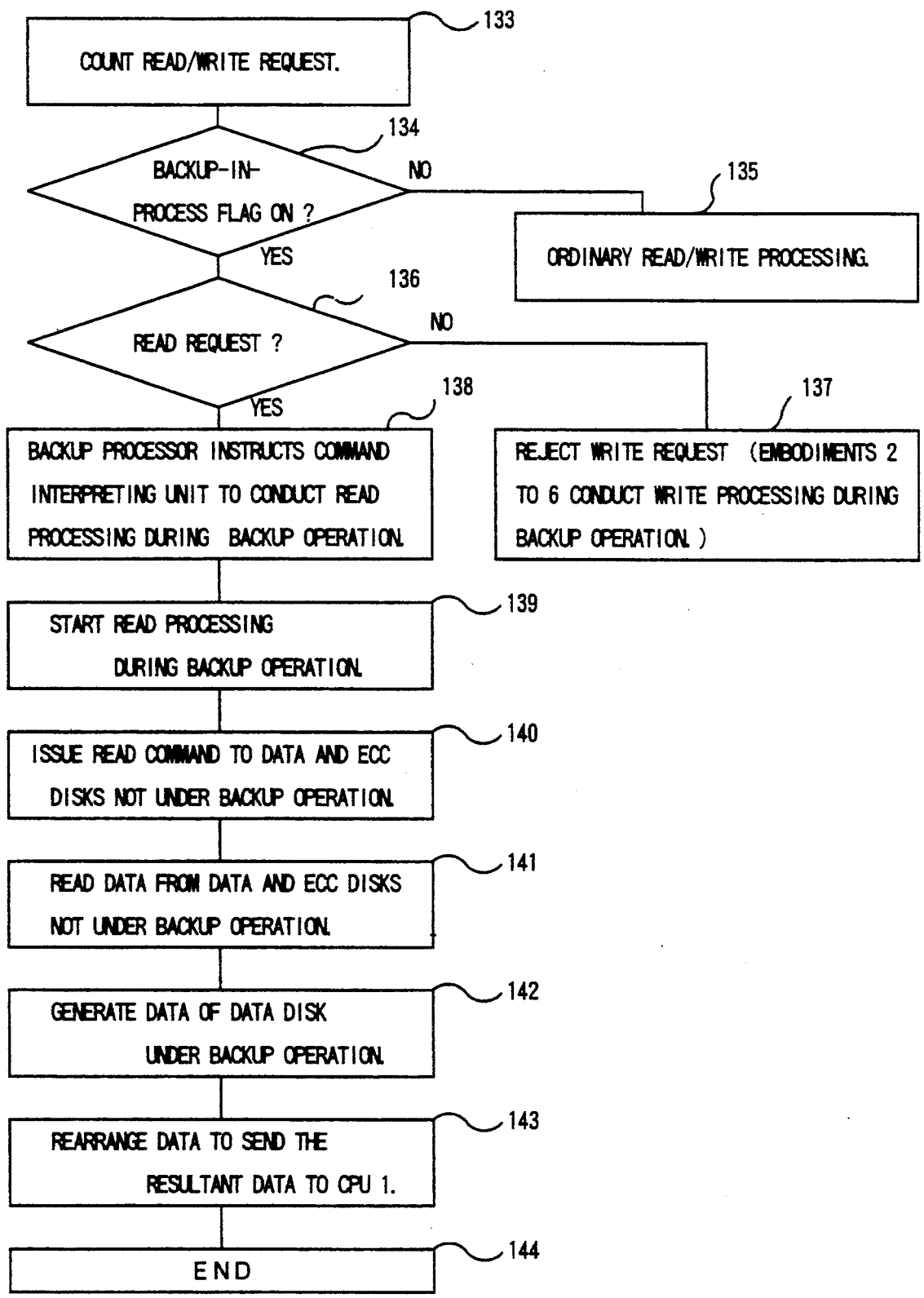
FIG. 13 is a flowchart showing procedures of read and write operations during the backup operation according to the present invention.

Referring next to FIG. 13, a description will be given of processing to be conducted when the CPU 1 issues a read/write request during the backup processing. The I/O request from the CPU 1 is subdivided by the command selector 18 into a data item and a command. The command is interpreted by the command interpreting unit 20. At the same time, the I/O request is counted by the I/O counter 22 (step 133). In order to determine whether or not the pertinent data disk is under a backup operation, the command interpreting unit 20 references the backup-in-process flag in the backup processor 23 (step 134). If the flag is OFF, the command interpreting unit 20 carries out an ordinary read/write processing (step-135). If the flag is ON, the backup processor 23 instructs the command interpreting unit 20 to initiate a control processing on a read command during the backup operation (step 138). In response thereto, the command interpreting unit 20 starts the read control processing (step 139) to request the read command only to the data disks and the ECC disk not under the backup operation (step 140). On receiving the command, the data disks and the ECC disk transfer therefrom the relevant subdata items and the ECCs to the data buffer 3 (step 141). The subdata items thus received by the data buffer 3 are then processed by the data reconstructing unit 4 so as to restore the subdata item loaded in the data disk under the backup operation (step 142). The data dividing unit 19 of the DCU 2 rearranges the subdata items into data of a data format before the subdivision, thereby sending the resultant data to the CPU 1 (step 143).

In the read processing during the backup processing, the subdata item of the data disk under the backup operation is restored from the subdata items on the data disks not under the backup operation and the ECCs from the ECC disk. Consequently, the read processing above takes a slightly longer period of time when compared with the ordinary read processing, which hence leads to a little increase in the response time. Furthermore, in this embodiment, a write request is rejected while the backup operation is taking place. As described above, although the I/O requests from the CPU 1 can be received even during the backup operation, the processing performance of the system is slightly lowered. For this reason, the backup operation is desirably achieved during a period of time when a lower number of I/O requests are requested from the CPU 1. In order to determine the favorable condition, the count value of the I/O counter 22 is checked in this embodiment.

In accordance with the present invention, the backup processor 23 supervises the backup operation, while the command interpreting unit 20 controls the read and write operations. Namely, other than the CPU, a dedicated processor is employed for the backup processing, which hence enables the backup processing and the I/O processing to be simultaneously accomplished.

Figure 11:
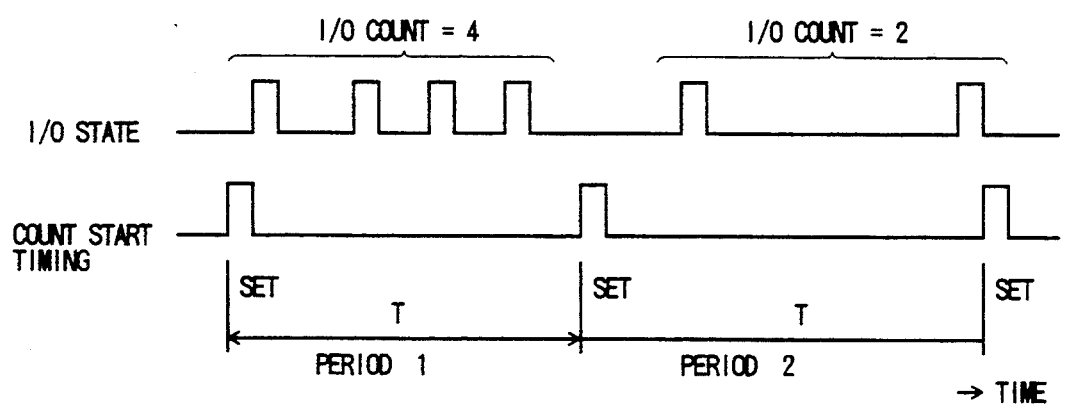
FIG. 11 is a signal timing chart of the first embodiment.

Referring next to FIG. 11, a description will be given of a method of monitoring the input/output state. The I/O requests received by the command interpreting unit 20 is counted by the I/O counter 22. As shown in FIG. 11, when a count, start timing is set, the I/O counter 22 immediately starts counting the I/O requests. The counting is continuously achieved until a fixed time is thereafter elapsed to set the next count start timing. In FIG. 11 including periods 1 and 2 of an identical period of time T, there are shown four and two I/O requests in the periods 1 and 2, respectively. The backup processor 23 monitors the I/O counts in the respective periods and also memorizes the previous backup time. When a period of time elapsed therefrom or the I/O count in a period reaches a reference value, the backup processor 23 requests a backup start request or a backup initiate command. When a backup operation is started in response to the request of the above request, the backup processor 23 sets a backup-in-process flag to ON to reject a write request during the backup operation. As can be seen from a timing chart of FIG. 3, when the backup command is received by a group of data disks 6a to 6d, data is sequentially transferred therefrom beginning from the data disk 6a to the backup disk 8. More specifically, when the data of the data disk 6a is completely sent to the backup disk 8, the data transfer operation proceeds to the data disks 6b, 6c, and 6d in a sequential manner.

Figure 3:
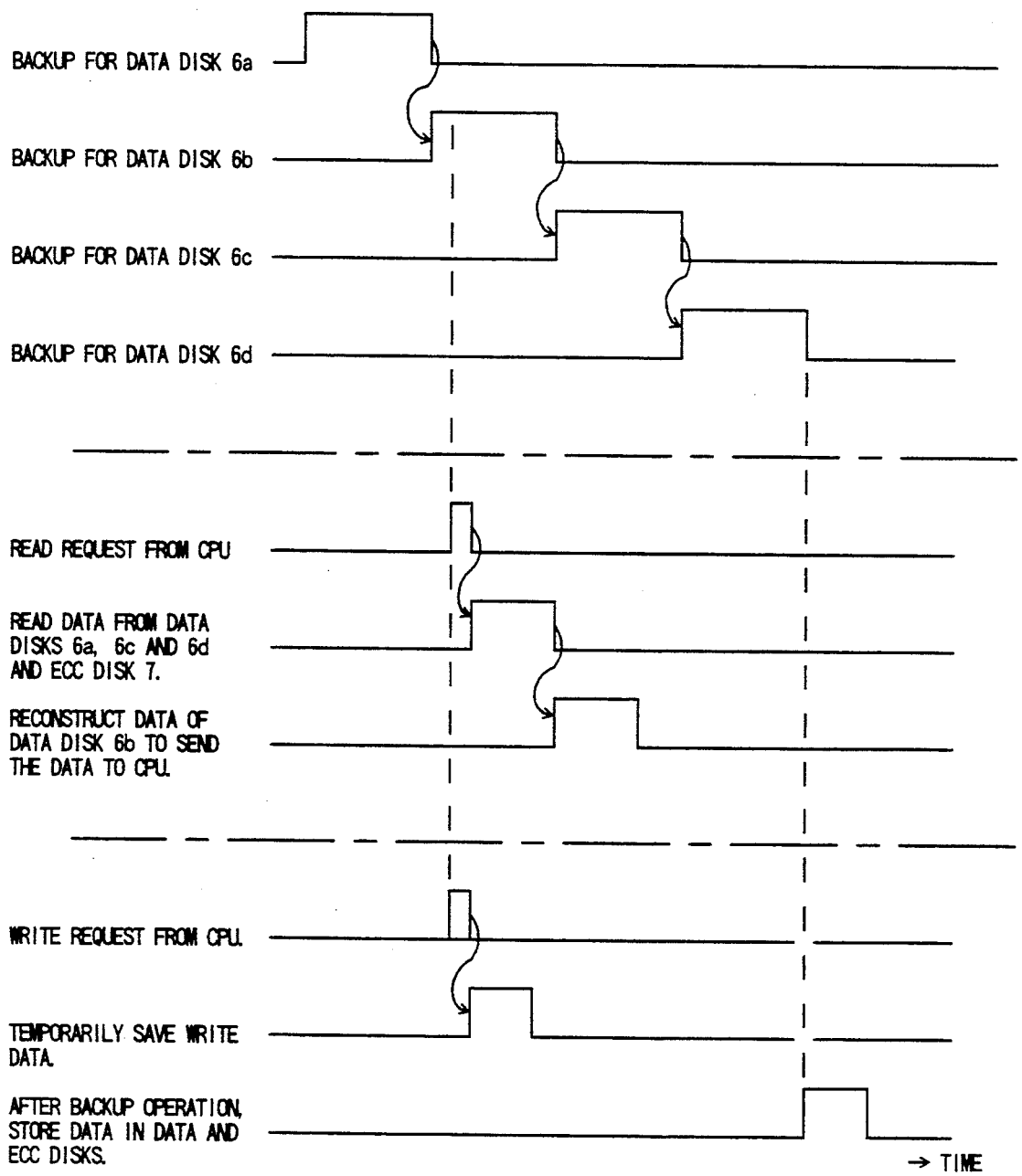
FIG. 3 is an operation timing chart showing the respective operations according to the present invention.

Subsequently, a description will be given of the system processing in a case where the CPU 1 requests a read request to a group of disks under the backup operation. Let us consider a case where, for example, as shown in FIG. 3, the CPU 1 requests a read request to the group while the data of the data disk 6b of the group is being transferred to the backup disk 8. The state that the group is under a backup operation has been recognized by the backup processor 23 in the DCU 2. The command interpreting unit 20 accordingly issues an instruction to control the read processing under the backup operation. In the control operation, for the read request issued to the data disk 6b during the backup operation, the system rejects an access to the disk 6b. Next, from the data disks 6a, 6c, and 6d and the ECC disk 7, the subdata items a, c, d, and ECCs are transferred to the data buffer 3. The data reconstructing unit 4 generates a subdata item b based on the received items to rearrange the subdata items into the original data to be sent to the CPU 1 under control of the DCU 2.

In this connection, it has been assumed in this embodiment that a write request from the CPU 1 is rejected, in order to preserve the consistency or integrity of the data, during the backup operation. Moreover, the backup disk may be implemented by a magnetic disk, an optical disk, or the like. Naturally, a magnetic tape may also be adopted for the backup use.

Embodiment 2

Figure 4:
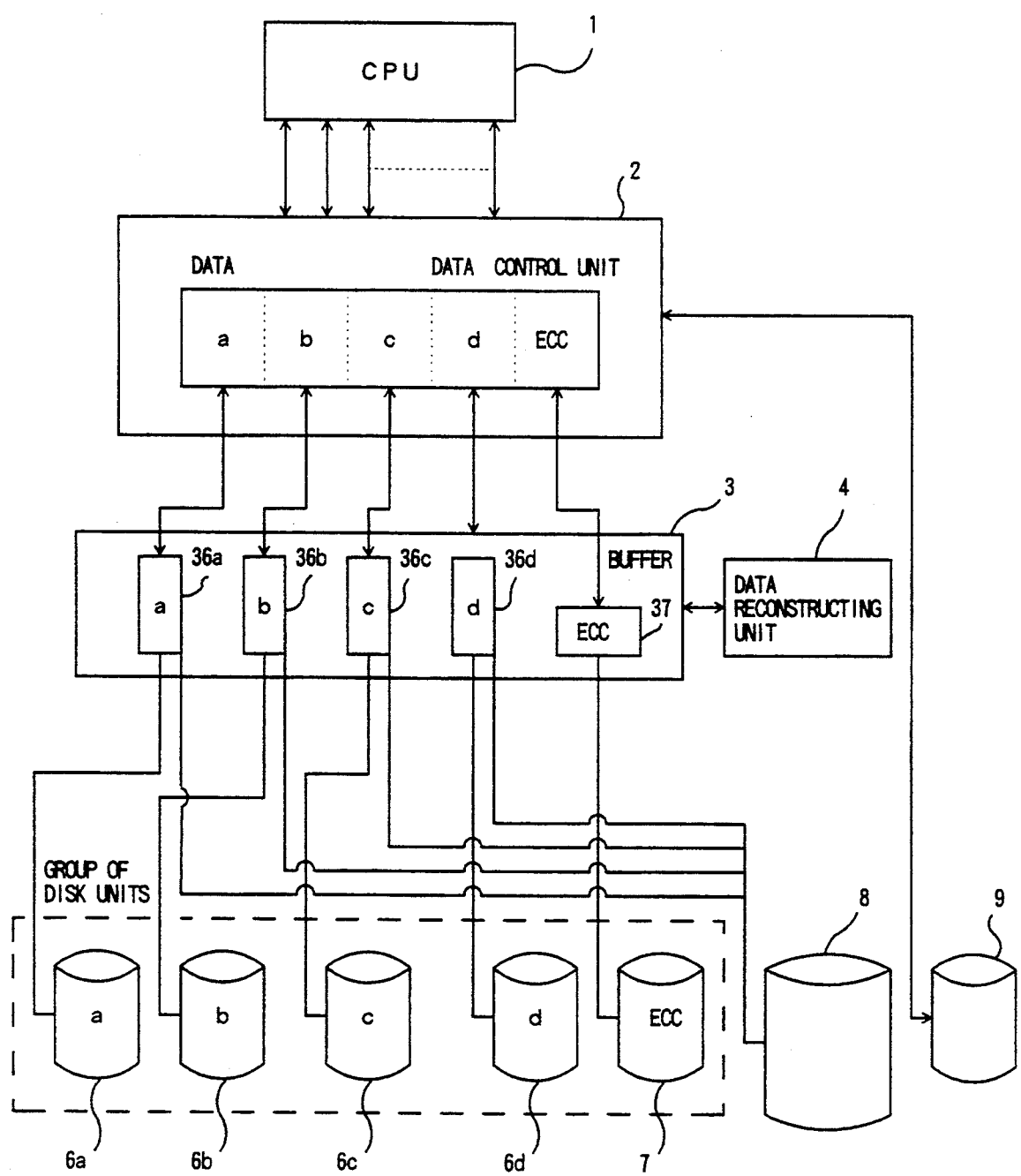
FIG. 4 is a diagram showing the configuration of a second embodiment of the array disk subsystem according to the present invention.

Referring now to FIG. 4, a description will be given of an embodiment wherein an array disk subsystem having a backup disk 8 as shown in FIG. 2 includes a write data storing disk 9 for temporarily storing therein, when a write request is received as a result of an I/O command issued from the CPU 1 during a backup operation, a write data item until the backup operation is completed.

In response to a write request sent from the CPU during the backup operation, in order to conduct the backup processing on the disk drives 6a to 6d in a sequential manner, the write request cannot be accepted when the integrity of the data is taken into consideration. In this embodiment, to overcome this difficulty, as shown in FIG. 3, when a write request is issued during a backup operation, the write data item is saved in the write data storing disk 9 under control of the DCU 2 as shown in FIG. 4.

When the backup-in-process flag is ON in the backup processor 23, the DCU 2 prevents the command selector 18 from sending the write data item to the data dividing unit 19. Namely, the write data item is directly transferred to the write data storing disk 9 to be recorded thereon. If the command selector 18 is provided with a buffer memory, the write processing is assumed to be terminated when the write data item is loaded in the buffer memory. Thereafter, the data of the buffer memory in the command selector 18 is read therefrom to be written on the write data storing disk 9. In this situation, the buffer memory of the command selector 18 is required to be supported by a battery. If the buffer memory is missing, the completion of the write processing is notified to the CPU 1 when the write data item is stored on the write data storing disk 9. After the backup operation is completed for all data disks 6a to 6d of the group, the write data item thus saved on the disk 9 during the backup operation is transferred to the DCU 2. The data subdivision and the ECC generation are then conducted under control of the DCU 2 so as to respectively load the subdivided data items and the ECCs on the data disks 6 and the ECC disk 7 in a similar manner to that employed in an ordinary write processing. In this regard, the DCU 2 continuously monitors the I/O requests from the CPU 1 to achieve the backup processing above in a period when a lower number of I/O requests are issued from the CPU 1. Moreover, the CPU 1 does not participates in the backup processing. In addition, according to this embodiment, the DCU 2 can separately achieve the write processing requested by the CPU 1 and the backup processing in an independent fashion, which prevents the backup processing from decreasing the system throughput. Furthermore, the read processing during a backup operation and other constituent elements and reference numerals are the same as those of the embodiment 1.

In the present embodiment, a magnetic disk, an optical disk, or the like is considered to be adopted as the write data storing disk 9 on which the write data item is to be written during a backup operation. However, in place of the magnetic or optical disk above, a nonvolatile semiconductor memory may naturally be employed. When compared with the magnetic or optical disk, the nonvolatile semiconductor memory may increase the data transfer speed and hence may improve the system throughput.

Embodiment 3

In an array disk system capable of achieving a backup operation as shown in FIG. 2, the data buffer 3 is not used during the backup processing. Consequently, the data buffer 3 may be utilized as follows. Namely, in response to a write request received during a backup operation, the DCU 2 conducts the subdivision like in an ordinary write operation to attain write subdata items and to produce ECCs so as to load the resultant subdata items in the data buffer 3. At this point, the completion of the write processing is reported to the CPU 1. After the backup operation is completed on the objective group of disks, the ordinary write processing is conducted. In this situation, the data buffer 3 is required to be powered from a battery unit. The other constituent components are the same as those of the embodiment of FIG. 2.

Embodiment 4

Figure 5:
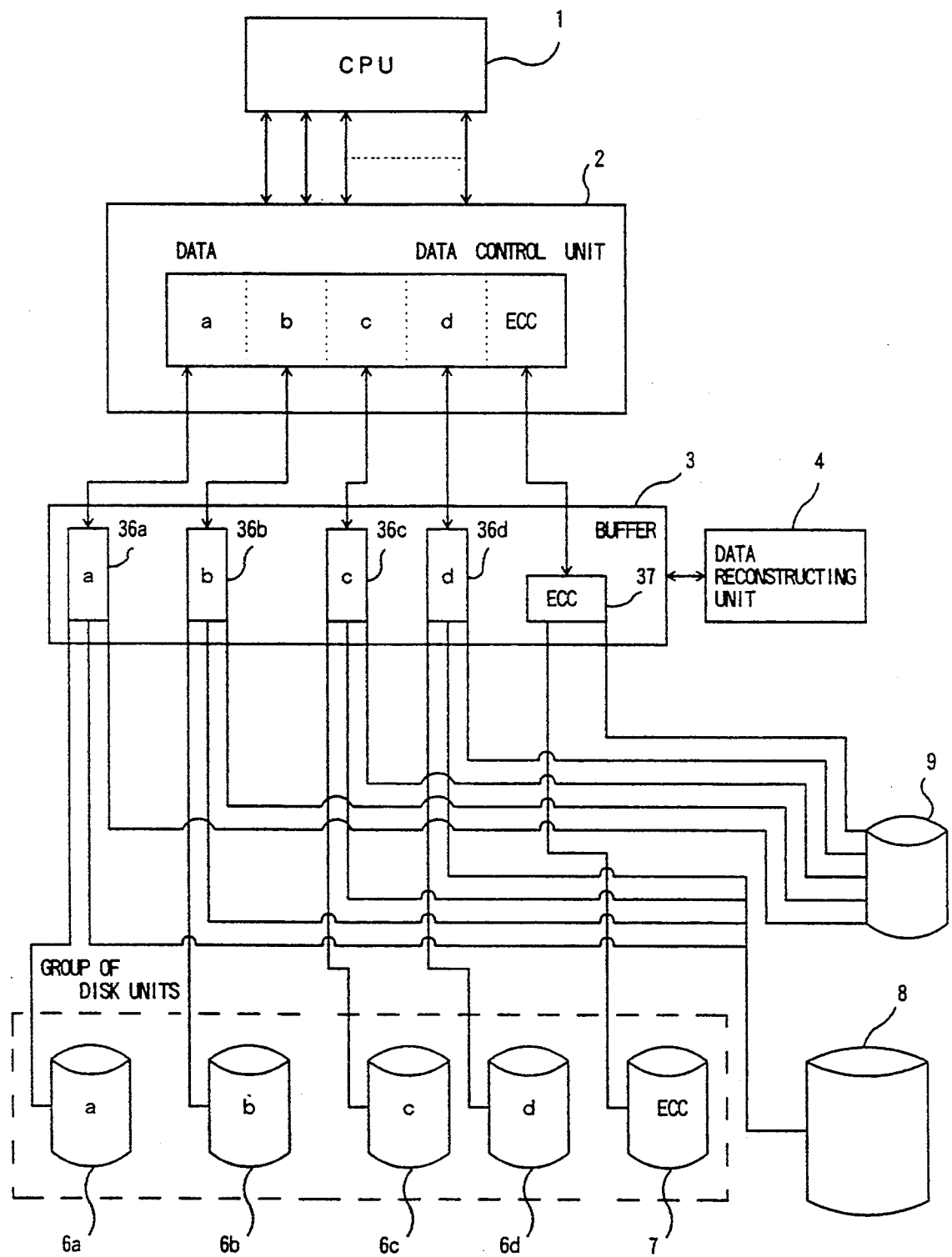
FIG. 5 is a diagram showing the system configuration for explaining fourth and fifth embodiments according to the present invention.
Figure 6:
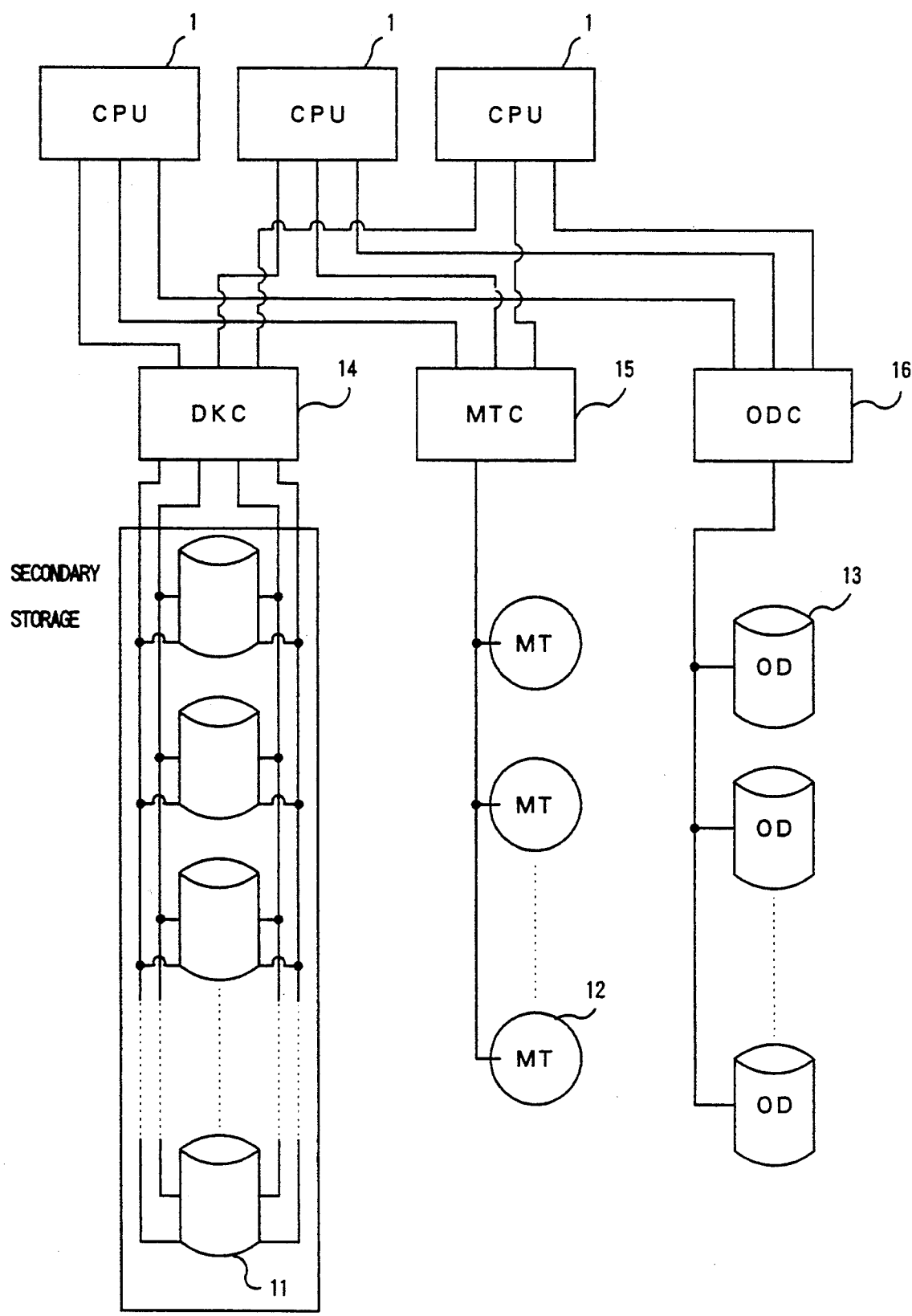
FIG. 6 is a diagram showing the constitution of a conventional input/output system.

FIG. 5 shows a case where the data buffer 3 is connected to a write data storing disk 9 disposed to store therein, in response to a write request sent from the CPU during a backup operation, write subdata items of the write request until the backup operation of the pertinent group of disks is finished. As described in conjunction with the embodiment 3, the backup processing is accomplished under control of the DCU 2, namely, the data buffer 3 is not utilized. In this situation, the data buffer 3 can be used as follows. When a write request is requested from the CPU during a backup operation on the group, the DCU 2 having recognized that the group is under the backup operation achieves processing in which the write subdata items are saved to be kept retained until the backup operation is completed. More concretely, like in an ordinary write processing, the DCU 2 carries out the write data division and the ECC generation for the subdivided data items to store the resultant subdata items and ECCs in the data buffer 3, which are transferred to the write data storing disk 9 in a parallel manner. The disk 9 has a plurality of disk surfaces and a plurality of magnetic heads corresponding thereto. Namely, the subdata items and the ECCs are recorded on the disk surfaces in a concurrent fashion. After the backup processing is terminated on the group, the subdata items and the ECCs are simultaneously read from the write data storing disk 9 by the respective heads under control of the DCU 2 to be transferred to the data buffer 3. Thereafter, an ordinary write processing is conducted to respectively load the subdata items and the ECCs from the data buffer 3 onto the data disks 6a to 6d and the ECC disk 7 of the group. The data transfer between the data buffer 3 and the write data storing disk 9 is achieved in a parallel manner at a high speed, which hence improves the system throughput. In this embodiment, in order to adjust timings of the write operation, the subdata items and the ECCs are temporarily loaded from the write data storing disk 9 into the data buffer 3 to be thereafter transferred onto the disks 6a to 6d and the ECC disk 7. However, if necessary, the data write operation may be in principle possibly conducted directly from the disk 9 onto the data disks 6a to 6d and the ECC disk 7. Other constituent elements of the present embodiment are identical to those of the embodiment of FIG. 2.

Since the embodiment 3 employs a buffer memory to save therein the write data item, a battery backup operation is necessary. However, the embodiment 4 adopts a magnetic disk for the write data item, which leads to an advantage that the battery backup need not be achieved.

Embodiment 5

Figure 7:
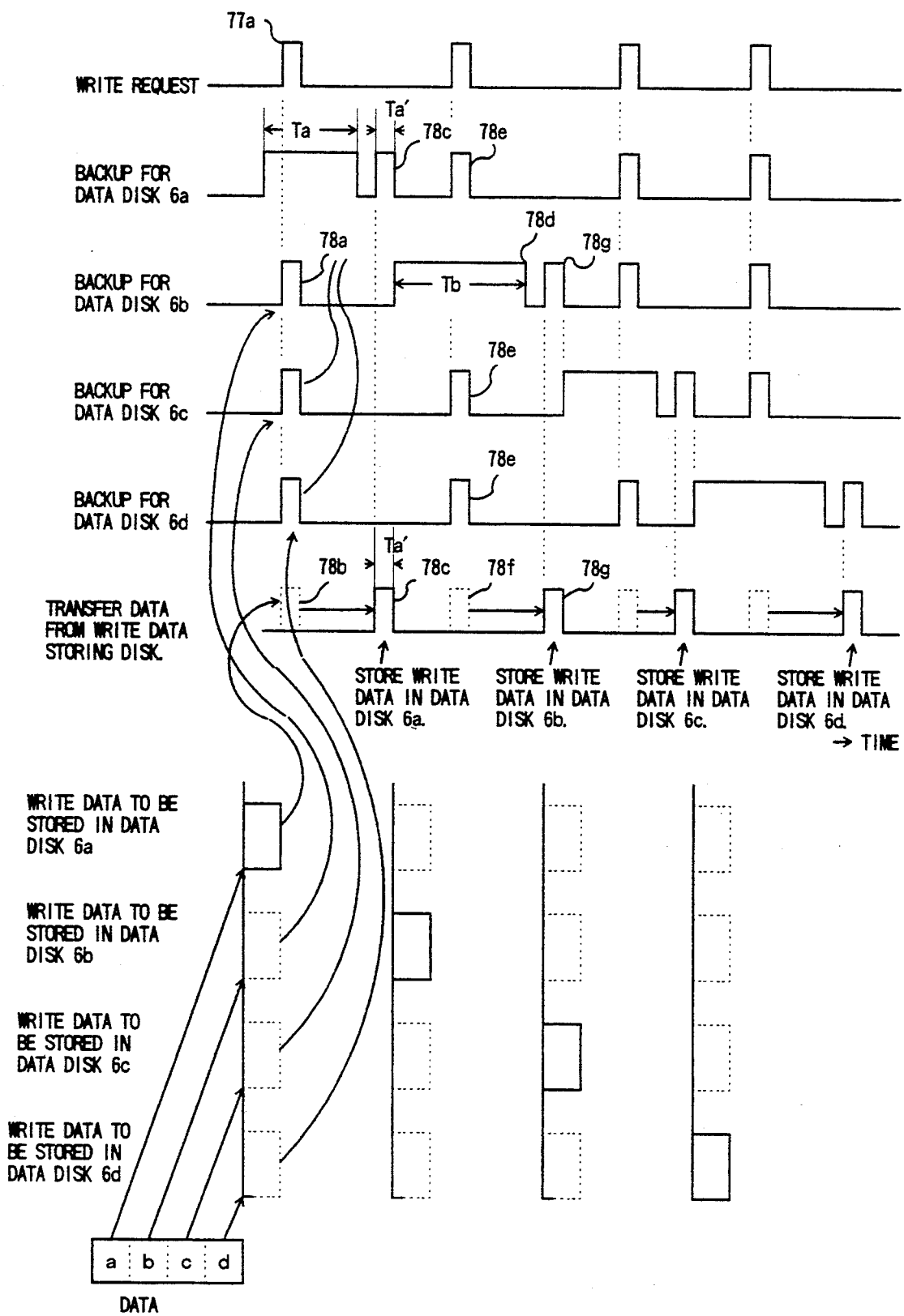
FIG. 7 is a timing chart showing the respective operations in the fifth embodiment of the present invention.

In the embodiment 4, when a write request is issued during a backup operation, the write subdata items and the ECCs are provisionally loaded on the write data storing disk 9 in a parallel fashion. When the backup operation is completed for all data disks 6a to 6d, the subdata items and the ECCs are written from the write data storing disk 9 onto the data disks 6a to 6d and the ECC disk 7. In the embodiment 5, each time the backup operation is completed on a data disk, the subdata item to be written thereon is stored on the data disk in a sequential manner. FIG. 7 shows an operation timing chart of the operation above. In a system shown in FIG. 5, when a write request 77a is issued to the data disk 6a during a backup operation (period Ta), the subdata items and the ECCs to be respectively loaded on the data disks 6b, 6c, and 6d and the ECC disk 7 are respectively stored thereon (78a), whereas only the subdata item for the disk 6a is written on the write data storing disk 9 (78b). When the backup operation is finished on the data disk 6a, the associated subdata item is immediately transferred from the disk 9 onto the data disk 6a (78c). When the write operation is completed, the backup operation is started on the data disk 6b (78d). In this connection, during a write operation from the disk 9 onto the data disk 6a (period Ta'), any write request to the pertinent disk group is rejected. Subsequently, when a write data item is received during a backup operation (period Tb) on the data disk 6b, the data disks 6a, 6c, 6d and the ECC disk 7 are respectively loaded with the associated subdata items and ECCs (78e and 78f). After the completion of the backup operation on the data disk 6b, the items and ECCs are written from the write data storing disk 9 onto the data disk 6b (78g). Similarly, the backup processing is sequentially achieved on the data disks 6c and 6d. In this embodiment, the write data storing disk 7 may be implemented by a nonvolatile semiconductor memory supported by a battery for the operation above. The other operations and constituent components of the system are the same as those of the embodiment 4.

Embodiment 6

Figure 8:
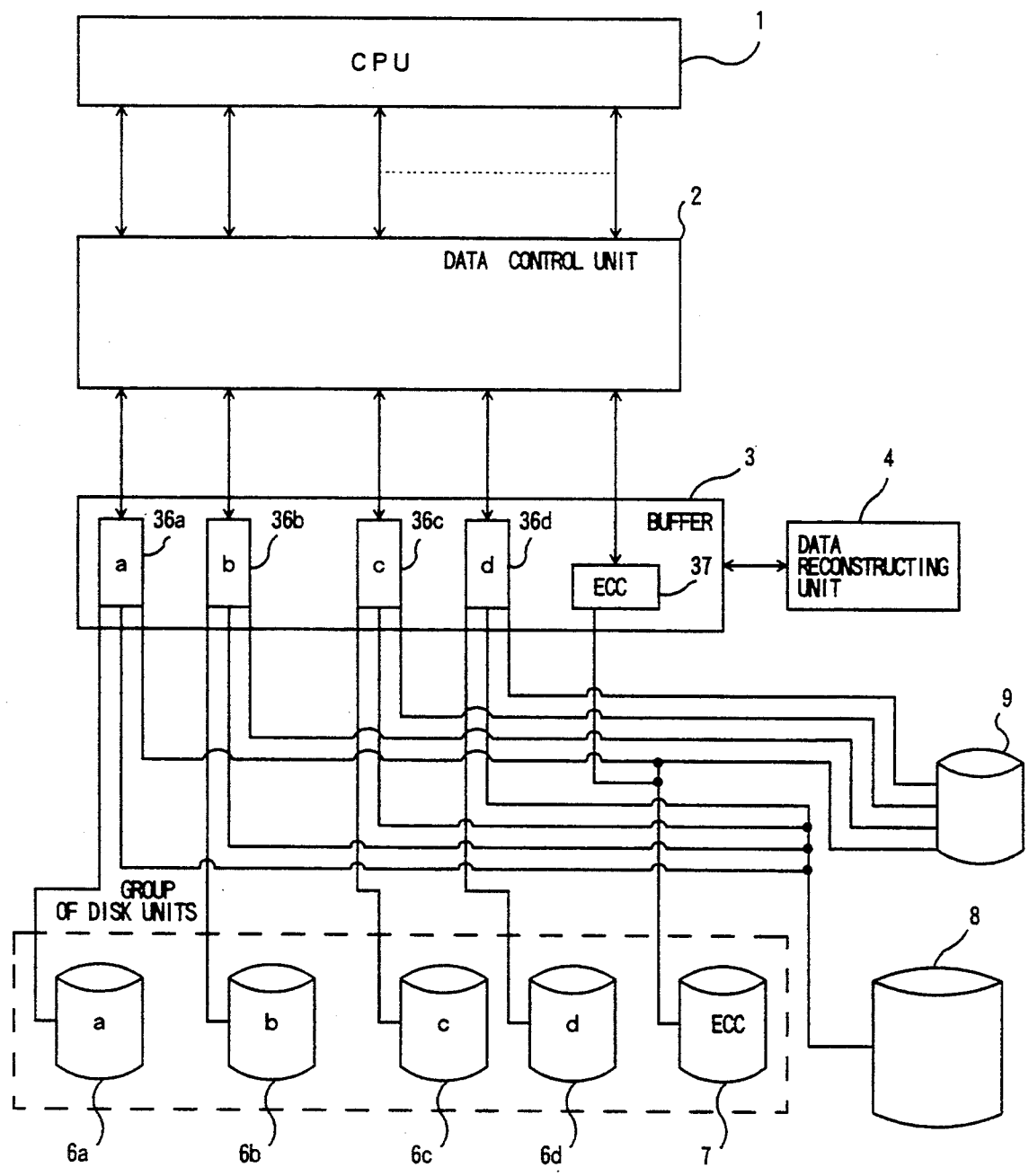
FIG. 8 is a diagram showing the configuration of a sixth embodiment of the array disk subsystem according to the present invention.

Referring now to FIG. 8, a description will be given of an embodiment according to the present invention in which subdivided data items are sent from a host (CPU 1) to the system. The CPU 1 splits a data item into subdata items in a certain unit to send the subdata items to the DCU 2 in a parallel manner. The DCU 2 achieves a control operation on data items in the disk subsystem. In a write operation, the parallel data items thus received from the CPU 1 are stored in the data buffer 3 under control of the DCU 2 without changing the data items. The DCU 2 produces ECCs for these data items from the CPU 1 to similarly transfer the ECCs to the data buffer 3. The data buffer 3 absorbs the difference or skew with respect to time of the data items and the ECCs transferred in a parallel fashion to adjust timings (associated with the seek time and the rotation latency) for the write operations on the data disks 6a to 6d. When a free path exists for the data disks 6a to 6d, the associated subdata items and ECCs are transferred thereto and to the ECC disk 7. In a read operation, the respective subdata items are read from the related data disks 6a to 6d to be transferred in parallel into the data buffer 3. Absorbing the skew with respect to time of the respective subdata items, the data buffer 3 determines an appropriate transfer timing (for a free path) to the CPU 1 so as to send the subdata items thereto. Also in this embodiment, the backup method described in conjunction with the embodiments 4 and 5 may be employed.

Figure 9A:
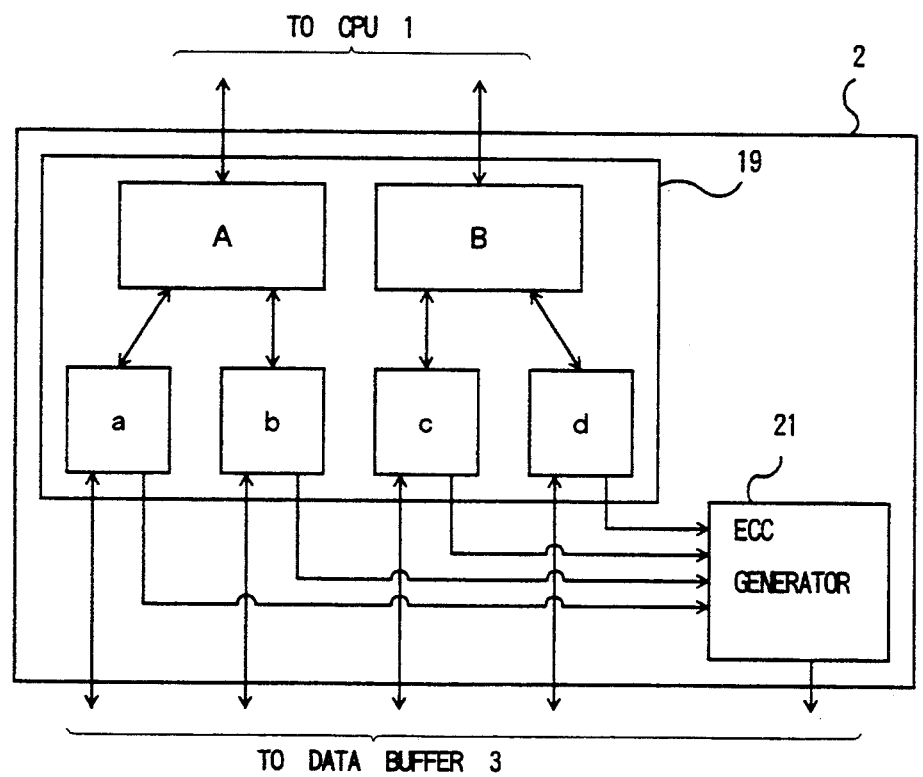
FIGS. 9A and 9B are diagrams useful to explain the operation of a data control unit in the sixth embodiment.
Figure 9B:
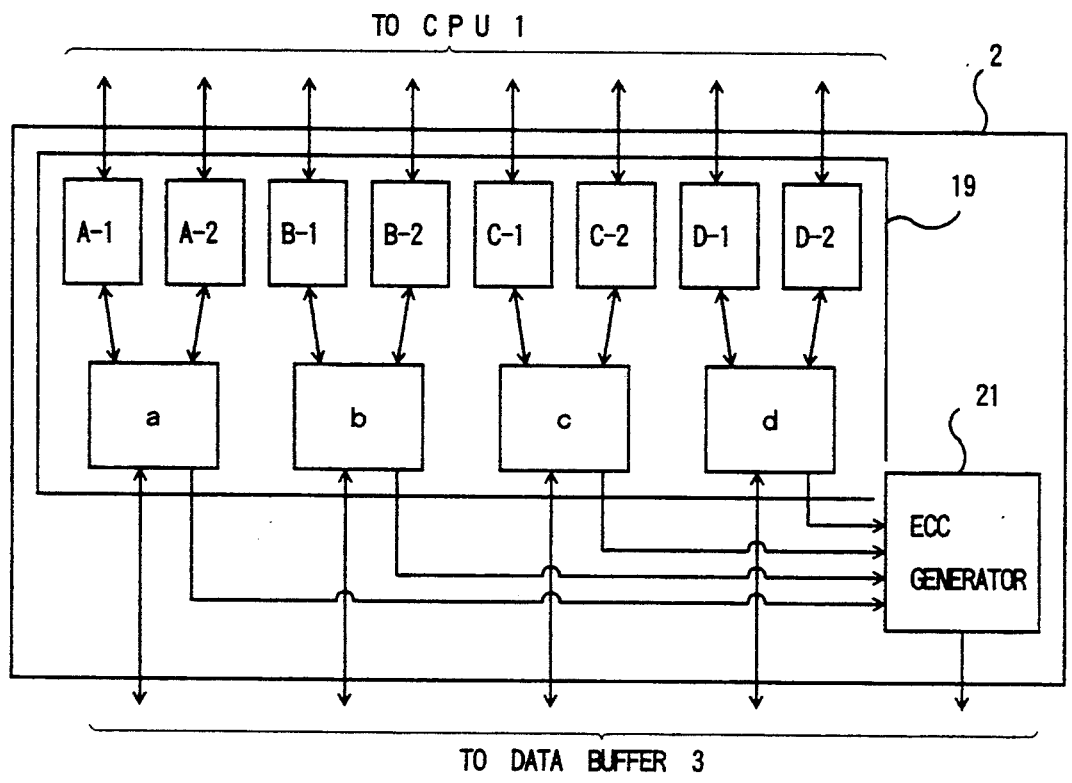

As can be seen from FIGS. 9A and 9B showing the data dividing unit 19 and the ECC generator 21 of DCU 2, a data item may be further subdivided or subdivided data items may he rearranged to form a data item. Specifically, as shown in FIG. 9A, each of data items A and B divided by and transmitted from the CPU 1 may be again subdivided to finally attain four subdata items a, b, c, and d, which are then stored on respective data disks. Alternatively, as shown in FIG. 9B, eight data items A-1, A-2, B-1, B-2, C-1, C-2, D-1, and D-2 divided by and sent from the CPU 1 may be gathered to obtain four data items a, b, c, and d to be loaded on respective data disks. The number of subdata items attained through the data division need only be appropriately selected in consideration of the system performance, the control method, etc. The other constituent elements are identical to those of the embodiment shown in FIG. 2.

Although magnetic disks are employed in the embodiments 1 to 6, storages such as optical and floppy disks may be adopted for achieving the same object. The data disks 6a to 6d and the ECC disk 7 respectively storing the subdivided data items and the ECCs thereof may be installed in a disk drive unit so as to be fixed onto an identical spindle or may be mounted in different disk drive units.

As described above, according to the present invention, the backup processing is accomplished without using the host (CPU). Moreover, even when the backup operation is taking place, the ordinary I/O processing can be conducted. As a results the backup processing does not prevent the I/O requests from being rejected for a long period of time, which has been the case in the prior art. This consequently removes the conventional disadvantage of the remarkable decrease in the system throughput.

As many apparently widely different embodiments of the present invention can be made without departing from the spirit and scope thereof, it is to be understood that the invention is not limited to the specific embodiments thereof except as defined in the appended claims.

We claim:

1. An array disk subsystem comprising:
   a data dividing unit for dividing write data supplied from an external device into a group of subdata;
   an ECC generator for producing ECC data for the group of subdata;
   a group of data disks for storing therein the group of subdata and the ECC data;
   a backup unit for holding duplicated data of data held in said group of data disks;
   means for monitoring a total of input/output commands supplied from the external device for data held in said group of data disks; and
   backup means, when a frequency of the input/output commands is less than a fixed value, for transferring data held in said group of data disks to said backup unit to conduct a backup operation of the data when the group of data disks are in a normal state.

2. An array disk subsystem according to claim 1 further including:
   means, when said monitoring means recognizes that a read command is requested from the external device to data held in said group of data disks in a form of a combination of a group of subdata and ECC data associated therewith and when one data disk of the group of data disks is under a backup operation, for accessing said group of data disks other than said one data disk to read the group of subdata other than one of the group of subdata held in said one data disk and the ECC data; and
   means for restoring the one subdata stored in but not read from the one data disk under the backup operation based on the group of subdata other than said one subdata and the ECC data thus read and for transferring to the external device, the group of subdata other than said one subdata and said one subdata obtained by the restoring.

3. An array disk subsystem according to claim 1 further including means, when said monitoring means recognizes that a write command is requested from the external device to data held in said group of data disks in a form of a combination of a group of subdata and ECC data associated therewith, when one data disk of the group of data disks is under a backup operation, for rejecting the write command.

4. An array disk subsystem according to claim 1 further including:
   a write data storing unit, when said monitor means recognizes that a write command is requested from the external device to data held in said group of data disks in a form of a combination of a group of subdata and ECC data associated therewith and when one data disk of the group of data disks is under a backup operation, for storing therein write data related to the write command; and
   means for writing the write data stored in said write data storing unit into said group of data disks after the backup operation of the group of the data disks is finished.

5. An array disk subsystem according to claim 4 wherein said writing means includes means for causing, after the backup operation is finished, said data dividing unit and said ECC generator to generate a group of subdata and ECC data from said write data and means for writing the generated group of data and the generated ECC data into said group of data disks.

6. An array disk subsystem according to claim 4 wherein said write data storing unit includes means for storing, as the write data, a group of subdata and ECC data generated by said data dividing unit and said ECC generator from said write data.

7. An array disk subsystem comprising:
   a data dividing unit for dividing write data supplied from an external device into a group of subdata;
   an ECC generator for producing ECC data for the group of subdata;
   a group of data disks for storing therein the group of subdata and the ECC data;
   a backup unit for holding duplicated data of data held in said group of data disks;
   backup means for transferring data held in said group of data disks to said backup unit as duplicated data when the group of data disks are in a normal state;
   means, when a read command is requested from the external device to data held in said group of data disks in a form of a combination of a group of subdata and ECC data associated therewith and when one data disk of the group of data disks is under a backup operation, for accessing said group of data disks other than said one data disk to read the group of subdata other than one of the group of subdata held in said one data disk and the ECC data; and
   means for restoring the one subdata stored in but not read from the one data disk under the backup operation based on the subdata and the ECC data thus read and for transferring to the external device, the group of subdata other than said one subdata and said one subdata obtained by the restoring.

8. A data processing apparatus comprising:
   a CPU;
   means for dividing data processed by said CPU into a group of subdata;
   means for producing ECC data for the group of subdata;
   a group of disk drive units for storing therein the group of subdata and the ECC data;
   a backup unit holding duplicated data of data held in said group of data disks;
   backup means for transferring data held in said group of data disks to said backup unit as duplicated data;
   means operative when a read command is requested from said CPU to data held in said group of data disks in a form of a combination of a group of subdata and ECC data associated therewith and when one data disk of the group of data disks is under a backup operation, for accessing said group of data disks other than said one data disk to read the group of subdata other than one of the group of subdata held in said one data disk and the ECC data; and
   means for restoring the one subdata stored in but not read from the one data disk under the backup operation based on the subdata and the ECC data thus read and for transferring to the external device, the group of subdata other than said one subdata and said one subdata obtained by the restoring.

9. A data read method during a backup operation of an array disk subsystem including a data dividing unit for dividing write data supplied from an external unit into a group of subdata, an ECC generator for producing ECC data for the group of subdata, and a group of data disks for storing therein the group of subdata, the ECC data, and a backup unit comprising the following steps of:
   sequentially transferring to the backup unit data held in said group of data disks as duplicated data when the group of data disks are in a normal state;
   accessing, in response to a read command supplied from the external device to data held in said group of data disks in a form of a combination of a group of subdata and ECC data associated therewith, when one data disk of the group of data disks is under a backup operation, said group of data disks to read the group of subdata other than one of the group of subdata held in said one data disk and the ECC data; and
   restoring the one subdata stored in but not read from the one data disk under the backup operation based on the group of subdata other than said one subdata and the ECC data thus read and for transferring to the external device, the group of subdata other than said one subdata and said one subdata obtained by the restoring.

10. An array disk subsystem comprising:
    a data dividing unit for dividing write data supplied from an external device into a group of subdata;
    an ECC generator for producing ECC data for the group of subdata;
    a group of data disks for storing therein the group of subdata and the ECC data;
    an I/O counter for counting I/O commands supplied by said external device;
    a backup processor for issuing a backup command based on count information of said I/O counter during the group of data disks are in a normal operational status; and
    a backup unit responsive to the backup command for sequentially reading data from the group of data disks to record therein the read data.

11. A disk array system, comprising:
    a group of data disks for holding groups of data and a plurality of ECC data each associated with one data group of the data groups;
    a backup storage for holding duplicated data of the groups of data and the plurality of ECC data; and
    backup means connected to said group of data disks and said backup storage for transferring the groups of data and the plurality of ECC data from said group of data disks to said backup storage when the group of data disks are in a normal operational condition, said backup means including:
means for detecting whether a number of I/O commands issued from an external device to access data held in said group of data disks satisfies a condition predetermined for a start of transferring; and
means for controlling a start of the transferring, depending upon the result of the detecting.

12. A disk array according to claim 11, wherein the predetermined condition is that a number of I/O commands issued from the external device during a predetermined period is less a predetermined threshold number.

13. A disk array system, comprising:
a group of data disks for holding groups of data and a plurality of ECC data each associated with one data group of the data groups;
a backup storage for holding duplicated data of the groups of data and the plurality of ECC data; and
backup means connected to said group of data disks and said backup storage for transferring the groups of data and the plurality of ECC data from said group of data disks to said backup storage when the group of data disks are in a normal operational condition, said backup means including:
means for detecting whether a frequency of issuing of I/O commands from an external device to access data held in said group of data disks satisfies a condition predetermined for start of the transferring; and
means for controlling a start of the transferring, depending upon the result of the detecting.

14. A disk array according to claim 13, wherein the predetermined condition is that the frequency of issuing of I/O commands is less than a predetermined threshold frequency.

15. A disk array according to claim 13, wherein the frequency is measured in terms of a number of I/O commands issued from the external device during a predetermined period.

16. A disk array system, comprising:
a group of data disks for holding groups of data and a plurality of ECC data each associated with one data group of the data groups;
a backup storage for holding duplicated data of the groups of data and the plurality of ECC data; and
backup means connected to said group of data disks and said backup storage for transferring the groups of data and the plurality of ECC data from said group of data disks to said backup storage when the group of data disks are in a normal operational condition, said backup means including:
means for counting a number of I/O commands issued from an external device to access data held in said group of data disks;
means for starting transferring in case the counted number is less than a predetermined threshold number after a predetermined time period;
means for causing said counting means to start a counting operation after completion of the transferring, in case the transferring has been started and for causing said counting means to start a counting operation, in case the counted number is not less than the predetermined threshold number after the predetermined time period.

17. A disk array system, comprising:
a group of data disks;
a backup storage for holding duplicated copy of data held by said of data disks;
backup means connected to said group of data disks and said backup storage for transferring the data held by said the group of data disks to said backup storage when the group of data disks are in a normal operational condition, said backup means including:
means for detecting whether a number of I/O commands issued from an external device to access data held in said group of data disks satisfies a condition predetermined for starting of the transferring; and
means for controlling the start of the transferring, depending upon the result of the detecting.

18. A disk array according to claim 17, wherein the predetermined condition is that a number of I/O commands issued from the external device during a predetermined period is less a predetermined threshold number.

19. A disk array system, comprising;
a group of data disks;
a backup storage for holding duplicated data of data held by said group of data disks; and
backup means connected to said group of data disks and said backup storage for transferring the data held by said group of data disks to said backup storage when the group of data disks are in a normal operational condition, said backup means including:
means for detecting whether a frequency of issuing of I/O commands from an external device to access data held in said group of data disks satisfies a condition predetermined for start of the transferring; and
means for controlling start of the transferring, depending upon the result of the detecting.

20. A disk array according to claim 19, wherein the predetermined condition is that the frequency of issuing of I/O commands is less than a predetermined threshold frequency.

21. A disk array according to claim 20, wherein the frequency is measured in terms of a number of I/O commands issued from the external device during a predetermined period.

22. A disk array system, comprising:
a group of data disks;
a backup storage for holding a duplicated copy of data held by said group of data; and
backup means connected to said group of data disks and said backup storage for transferring the data held by said group of data disks to said backup storage during operation of the group of data disks in a normal operational condition, said backup means including:
means for counting a number of I/O commands issued from an external device to access data held in said group of data disks;
means for starting the transferring in case the counted number is less than a predetermined threshold number after a predetermined time period;
means for causing said counting means to start a counting operation after completion of the transferring, in case the transferring has been started and for causing said counting means to start a counting operation, in case the counted number is not less than the predetermined threshold number after the predetermined time period.

23. A disk array system, comprising:

a group of data disks for holding groups of data and a plurality of ECC data each associated with one data group of the data groups;

a backup storage for holding a duplicated copy of the groups of data and the plurality of ECC data;

backup means connected to said group of data disks and said backup storage for transferring the groups of data and the plurality of ECC data from said group of data disks to said backup storage during operation of the group of data disks in a normal operational condition;

means responsive to a read request which is supplied from an external device when one data disk of the group of data disks is involved in a backup operation by said backup means and which requires readout of at least one data held by the one data disk, for reading other data belonging to one group of data to which the one data belongs and ECC data associated with the one group of data, from the group of data disks other than said one data disk; and means for restoring the one data from the other data and the ECC data that is read and for supplying the restored one data to said external device as read out data.

* * * * *